United States Patent
Eisert

(10) Patent No.: US 6,474,959 B2
(45) Date of Patent: Nov. 5, 2002

(54) LIQUID PUMP, IN PARTICULAR, DETERGENT LIQUID PUMP FOR HOUSEHOLD APPLIANCES, AND METHOD FOR ASSEMBLING IT

(75) Inventor: Horst Eisert, Waldbüttelbrunn (DE)

(73) Assignee: BSH Bosch und Siemens Hausgeräte GmbH, Munich (DE)

( * ) Notice: Subject to any disclaimer, the term of this patent is extended or adjusted under 35 U.S.C. 154(b) by 0 days.

(21) Appl. No.: 09/802,526

(22) Filed: Mar. 2, 2001

(65) Prior Publication Data

US 2001/0024613 A1 Sep. 27, 2001

Related U.S. Application Data

(63) Continuation of application No. PCT/EP99/06186, filed on Aug. 23, 1999.

(30) Foreign Application Priority Data

Sep. 2, 1998 (DE) .......................................... 198 39 990

(51) Int. Cl.[7] .......................... F04B 17/00; F04B 35/04
(52) U.S. Cl. .............. 417/360; 417/423.14; 417/423.15
(58) Field of Search ........................... 417/360, 423.15, 417/424.1, 423.14, 423.7

(56) References Cited

U.S. PATENT DOCUMENTS

| 2,931,307 | A | * | 4/1960 | Smith ........................ 310/157 |
| 4,247,265 | A | * | 1/1981 | Cavalcante .............. 417/423.7 |
| 6,053,708 | A | * | 4/2000 | Nishikawa .................. 417/360 |
| 6,287,090 | B1 | * | 9/2001 | Hamasaki et al. .......... 417/360 |

* cited by examiner

Primary Examiner—Charles G. Freay
(74) Attorney, Agent, or Firm—Laurence A. Greenberg; Werner H. Stemer; Ralph E. Locher

(57) ABSTRACT

A liquid pump includes a rotor, a rotor shaft, and a split cage for accommodating the rotor. A stator assembly is situated outside the split cage, and a pump casing has a pump-casing bottom and top part, a flange part, and a plug-in holder. The pump casing accomodates a pump impeller on the shaft, and the pump-casing top part has a plug-in holder. A method for assembling the liquid pump includes axially pressing a bearing into a bearing holder. O-rings are mounted on the split cage. The rotor is axially inserted into the split cage, which is axially pressed into the plug-in holder of the pump casing. The rotor shaft is simultaneously pressed into the pump impeller. The bearing holder has another supporting part and is axially pressed into the split cage. A cap together with the stator assembly are axially mounted onto the plug-in holder. The pump-casing bottom part is connected to the pump-casing top part, preferably with a pump-casing seal in between.

25 Claims, 2 Drawing Sheets

US 6,474,959 B2

LIQUID PUMP, IN PARTICULAR, DETERGENT LIQUID PUMP FOR HOUSEHOLD APPLIANCES, AND METHOD FOR ASSEMBLING IT

Cross-Reference to Related Application

This application is a continuation of copending International Application No. PCT/-EP99/06186, filed Aug. 23, 1999, which designated the United States.

BACKGROUND OF THE INVENTION

FIELD OF THE INVENTION

The invention relates to a liquid pump, in particular, a detergent liquid pump for household appliances and to a method for assembling such a pump.

The starting point for the subject matter of the invention are detergent liquid pumps such as those disclosed by German publication DE 90 16 330 U and German Published, Non-Prosecuted Patent Application DE 38 18 532 A1. As "wet-rotor" pumps, such detergent liquid pumps have a split cage or tube, within which a rotor, preferably, a permanently excited rotor, is rotatably mounted and has a wound stator assembly radially on the outside. In the prior art type of pump, the split cage/tube, which is preferably configured as a pot-shaped casing, merges at its pot-rim end into a flange that forms the base of a pump chamber and to which a pump casing can be connected with a seal in between. The rotor shaft is mounted rotatably in a bearing holder that can be fixed at the pot-rim end in the split cage, and one end of the rotor shaft, which carries a pump impeller, projects into the pump casing.

SUMMARY OF THE INVENTION

It is accordingly an object of the invention to provide a liquid pump, in particular, a detergent liquid pump for household appliances that overcomes the hereinafore-mentioned disadvantages of the heretofore-known devices and methods of this general type and that reduces the effort involved in manufacturing and assembling a liquid pump of this kind while providing a high degree of adaptability to the requirements of specific customers.

With the foregoing and other objects in view, there is provided, in accordance with the invention, a liquid pump, including a permanently excited rotor, a split cage having an outside and an axial end and defining an interior accommodating the permanently excited rotor, a stator, preferably, a wound stator assembly, radially situated on the outside of the split cage, a pump impeller, a rotor shaft having a shaft end, and a pump casing defining a casing interior accommodating the pump impeller on the shaft end. The pump casing is connected to the axial end of the split cage, and the pump casing and the split cage are retained together through an axial plug fit. The pump casing and the stator are retained together through an axial plug-fit. Preferably, the liquid pump is a detergent liquid pump for household appliances to be driven by a single-phase synchronous motor having a permanently magnetic rotor.

To reduce the effort involved in manufacture and assembly while providing a high degree of adaptability to the requirements of specific customers, the pump can be assembled on the modular principle by a technique involving mutual axial plug-in assembly at least between the split cage, together with the rotor mounted rotatably therein, and the pump casing and between the stator assembly or the cap accommodating the assembly and the pump casing. For noise deadening and sealing, a flexible intermediate supporting part, in particular an O-ring, is accommodated as a press fit at least in the plug-in joint between the split cage and the pump casing.

Given the construction of the liquid pump according to the invention, the most important modular components of the split cage or tube, with its bearing holders, of the pump casing and of the stator assembly or cap accommodating the stator assembly can be fitted in a particularly simple manner in the direction of the drive end from the non-drive end, at which the split cage is open and is readily accessible. The assembly is performed simply with plug-in or snap joints, without using screw fixings and fixing welds. If appropriate, the pump can be disassembled and replaced during testing or when damaged. At the same time, the stator assembly can be fixed advantageously without supporting loads relative to the split cage by virtue of its plug-in fit on the pump casing. According to a refinement of the invention, only an easy sliding fit involving mutual alignment is provided.

In accordance with another feature of the invention, there is provided a cap defining a cap interior accommodating the stator, and the stator and the pump casing are retained together through an indirect plug-fit.

In accordance with a further feature of the invention, the split cage and the cap or the stator are connected by a sliding and/or guiding fit free of significant radial supporting loads.

In accordance with an added feature of the invention, the split cage is pot-shaped and has a base, and the shaft end is a drive end projecting through the base into the pump casing and receiving the pump impeller.

In accordance with an additional feature of the invention, the pump impeller has a holder and the rotor shaft is inserted axially into the holder.

In accordance with yet another feature of the invention, the rotor shaft has a non-drive shaft end, the split cage has a non-drive cage end, and including a bearing holder holding the non-drive shaft end, the bearing holder being retained on the non-drive cage end in an axial plug-fit.

In accordance with yet a further feature of the invention, the liquid pump is configured to selectively assemble the split cage in an axial-plug fit with the pump casing from the non-drive shaft end, at least one of the stator and the cap receiving the stator in an axial-plug fit with the pump casing, the rotor shaft in an axial-plug fit with the pump impeller supported from the shaft end, and the non-drive end bearing holder in an axial-plug fit with the split cage.

In accordance with yet an added feature of the invention, the cap is to be configured by a user for matching user-specific requirements, particularly, connection and installation specifications, and otherwise has a universal motor component configuration.

In accordance with yet an additional feature of the invention, the split cage has plug-in holders, the stator has plug-in holders, the cap has plug-in holders, and the pump casing has a motor side. A radial flange is disposed at the motor side. An integrally formed axially projecting plug-in sleeve and plug-in holders mate corresponding ones of the plug-in holders of the split cage, the plug-in holders of the stator, and the plug-in holders of the cap.

In accordance with again another feature of the invention, there are provided a bearing holder holding the non-drive shaft end, the bearing holder being retained on the non-drive cage end in an axial plug-fit, and at least one flexible intermediate supporting part in a region of a mutual plug-fit retention between the split cage and the pump casing and between the bearing holder and the split cage.

In accordance with again a further feature of the invention, the at least one flexible intermediate supporting part is at least one flexible, elastomeric, intermediate supporting part.

By virtue of the flexible, in particular, elastomeric, intermediate supporting parts between the individual components to be connected by plug-fit retention, in particular, the split cage with the pump casing and the non-drive-end bearing holder with the split cage, it is possible, on one hand, to compensate for tolerances and avoid or compensate for mutual misalignment, to ensure a high degree of leaktightness against the escape of liquid from the pump casing or, where relevant, from the rotor chamber of the split cage and, at the same time, to achieve particularly low noise levels through the damping of vibration at the rotor or the windings.

In accordance with again an added feature of the invention, the at least one flexible, elastomeric, intermediate supporting part is at least one O-ring.

In accordance with again an additional feature of the invention, the at least one flexible intermediate supporting part is form-lockingly fixed relative to a respective pair of the split cage, the pump casing, and the bearing holder.

In accordance with still another feature of the invention, the form lock is at least one of a mutual snap connection and a latching connection.

In accordance with still a further feature of the invention, the at least one flexible intermediate supporting part is integrated.

In accordance with still an added feature of the invention, the pump casing has motor side and is divided axially into a pump-casing top part and a pump-casing bottom part, the pump-casing top part is disposed on the motor side; and the pump-casing bottom part faces away from the motor side and is connected to the pump-casing top part.

In accordance with still additional features of the invention, the pump-casing top part has an integral pressure branch and the pump-casing bottom part has an integral intake branch.

In accordance with still a further feature of the invention, the pump-casing bottom part is to be configured by a user, and the pump-casing top part has a universal motor component configuration.

With the objects of the invention in view, there is also provided a method for assembling a liquid pump including providing a liquid pump having a permanently excited rotor, a pot-shaped split cage having an outside, a drive end, and a non-drive end and defining an interior accommodating the permanently excited rotor, a wound stator assembly to be radially situated on the outside of the split cage, a pump impeller, a rotor shaft having a drive end, and a pump casing having a pump-casing top part, a pump-casing bottom part, a flange part, and a plug-in holder, the pump casing defining a casing interior accommodating the pump impeller on the shaft end, and the pump-casing top part having a plug-in holder. A drive-end bearing, preferably a journal bearing, is axially pressed into a drive-end bearing holder at the drive end of the split cage from the non-drive end. Flexible intermediate supporting parts, preferably, O-rings, are mounted on the drive end of the split cage. The rotor is axially inserted into the split cage from the non-drive end. The drive end of the split cage is axially pressed into the plug-in holder of the pump casing for retaining the split cage at the pump casing and the drive end of the rotor shaft is simultaneously pressed into the pump impeller. The pump impeller is supported from the drive end of the rotor shaft in the pump-casing top part. A flexible intermediate supporting part is mounted on a non-drive-end bearing holder prefitted with a bearing, preferably a journal bearing. The non-drive-end bearing holder is axially pressed into the split cage from the non-drive end. A cap together with the wound stator assembly are axially mounted onto the plug-in holder of the pump-casing top part in a direction from the non-drive end of the split cage for retaining the stator at the pump casing and bringing the cap and the stator assembly to bear on the flange part. The pump-casing bottom part is connected to the pump-casing top part, preferably with a pump-casing seal in between.

Other features that are considered as characteristic for the invention are set forth in the appended claims.

Although the invention is illustrated and described herein as embodied in a liquid pump, in particular, detergent liquid pump for household appliances, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
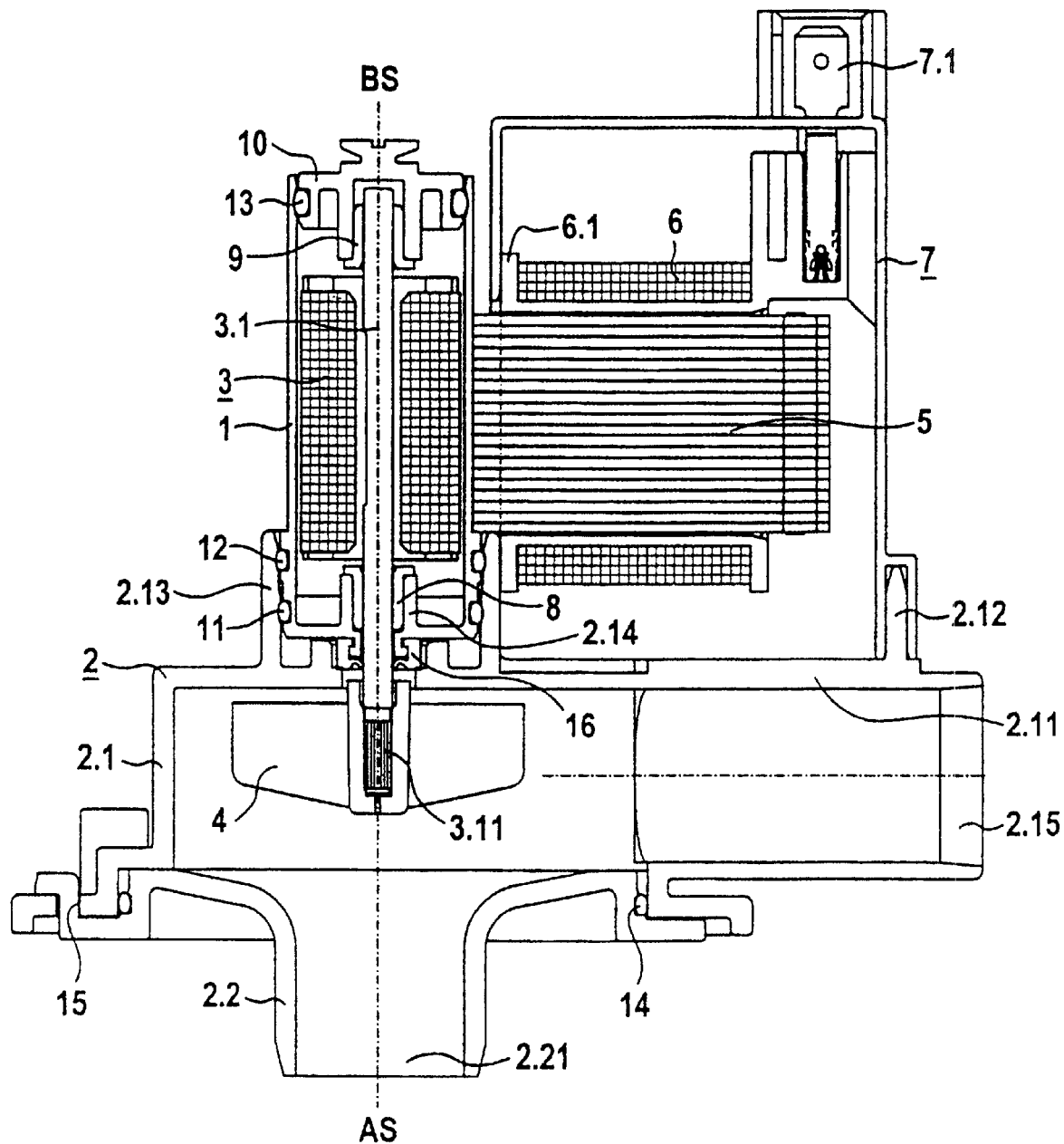
FIG. 1 is a diagrammatic cross-sectional view of a liquid pump assembly with a permanently excited single-phase synchronous motor having a split-cage rotor according to the invention.

In all the figures of the drawing, sub-features and integral parts that correspond to one another bear the same reference symbol in each case.

Referring now to the figures of the drawings in detail and first, particularly to FIG. 1 thereof, there is shown a liquid pump with a pump impeller 4. The pump impeller 4 is disposed in a pump casing 2 on a drive end 3.11 of the rotor shaft 3.1 of a single-phase synchronous motor with permanent magnet excitation mounted axially ahead of the pump casing 2, without hatching to indicate sectioning. The rotor 3, which is excited by a permanent magnet, of the single-phase synchronous motor is mounted rotatably in a pot-shaped split cage or tube 1 by a journal bearing 8 at the drive base end of the pot-shaped split cage 1 and a journal bearing 9 at the non-drive rim end of the pot-shaped split cage 1. The drive-end journal bearing 8 is accommodated in the base of the pot-shaped split cage 1. A lip seal 16, which can be snapped onto a holder on the split cage and rests by at least one sealing lip on the outer circumference of the rotor shaft 3.11, is mounted in front of the drive-end journal bearing 8 to prevent pumped liquid from penetrating into the rotor chamber of the split cage 1. The non-drive-end journal bearing 9 is pressed axially into a bearing holder 10 which, for its part, can be pressed axially into the open non-drive end of the split cage 1 and is retained in the latter as a plug-in fit.

The stator winding 6 of the single-phase synchronous motor is wound onto a coil former 6.1, which, for its part, is mounted on a stator assembly 5. The coil former 6.1 and, hence, the wound stator assembly 5 are a sliding fit in a cap 7. The cap 7 is provided with contacts 7.1 for connection of a customer-specific plug; if the customer's specification changes, all that is required for reliable connection is to make a corresponding change to the cap 7 in the region of its contact retention system.

According to the invention, the liquid pump is constructed such that both the split cage 1, prefitted with the rotor 3, and the cap 7, prefitted with the wound stator assembly 5, can be plug-fitted axially onto the pump casing 2 from the non-drive end by feeding them in axially from the non-drive end. The split cage 1 and the cap 7 are also constructed to be connected to the pump casing 2 by plug-fit retention such that no radial supporting loads are imposed between the wound stator assembly 5 or the cap 7 accommodating the latter, on one hand, and the split cage 1, on the other hand.

Advantageously, there is merely an easy sliding fit involving mutual alignment between these components.

To provide plug-fit retention between the split cage 1 and the wound stator assembly 5 or cap 7, on one hand, and the pump casing 2, on the other hand, the pump casing 2 is provided with a flange part 2.11 on the motor side. An axially projecting plug-in holder 2.12 is disposed on the flange part 2.11 to receive the cap 7. The cap 7 is moreover supported on the outer surface of the flange. Also disposed on the flange part 2.11 is an axially projecting plug-in sleeve 2.13, into which the drive end of the split cage 1 can be plugged axially, likewise giving plug-fit retention. The flange part 2.11 and the plug-in holder 2.12 are preferably formed integrally with the pump casing 2.

The pump casing 2 is advantageously axially divided into two parts, namely, into a pump-casing top part 2.1, preferably with an integral delivery branch 2.15, and a pump-casing bottom part 2.2, preferably with an integral intake branch 2.21. On one hand, the configuration ensures good accessibility for advantageous countersupport of the pump impeller 4 as the end 3.11 of the rotor shaft 3.1 is pressed into the pump impeller 4 during the plug-fit retention of the split cage 1 on the pump casing 2 without imposing axial loads on any bearing holder. On the other hand, the construction ensures that a single configuration can be employed for the pump-casing top part 2.1 because only the pump-casing bottom part 2.2 is adapted to the requirements of specific customers. To provide a simple leak-tight connection between the pump-casing top part 2.1 and the pump-casing bottom part 2.2, a bayonet joint 15 with a pump-casing seal 14 in between, expediently in the form of an O-ring that can be clamped onto the pump-casing bottom part 2.2 beforehand, is provided.

According to a refinement of the invention, flexible, in particular, elastomeric, intermediate supporting parts 11, 12, 13 are provided in the region of the mutual plug-fit retention between the split cage 1 and the pump casing 2, in particular, the flange part 2.11 of the pump-casing top part 2.1. The supporting parts are provided between the non-drive-end bearing holder 10 and the open end of the split cage 1. These flexible intermediate supporting parts 11, 12, 13 are used, on one hand, to compensate for tolerances and facilitate plug-fitting while providing securely seated retention and, on the other hand, to ensure an advantageous high degree of noise isolation and reliable sealing against the escape of pumped liquid.

Figure 2:
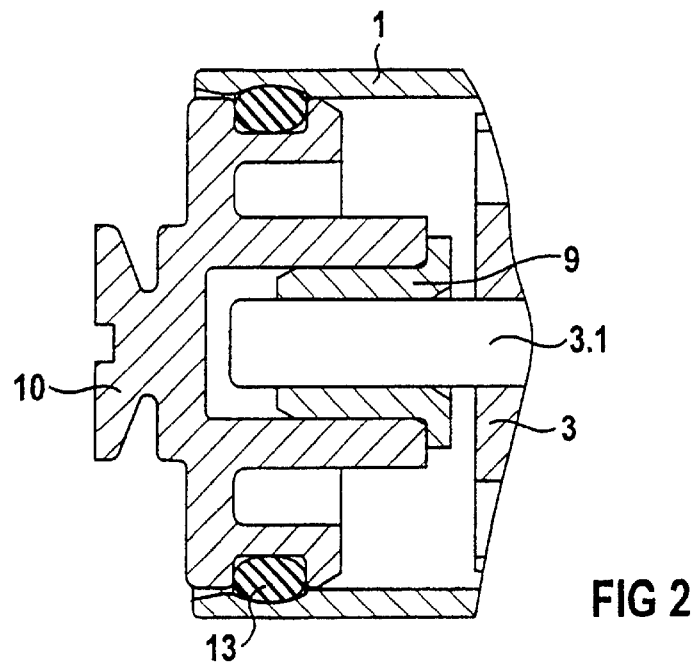
FIG. 2 is an enlarged, fragmentary, cross-sectional view of FIG. 1 in a region of the non-drive, rim end of the pot-shaped split cage.
Figure 3:
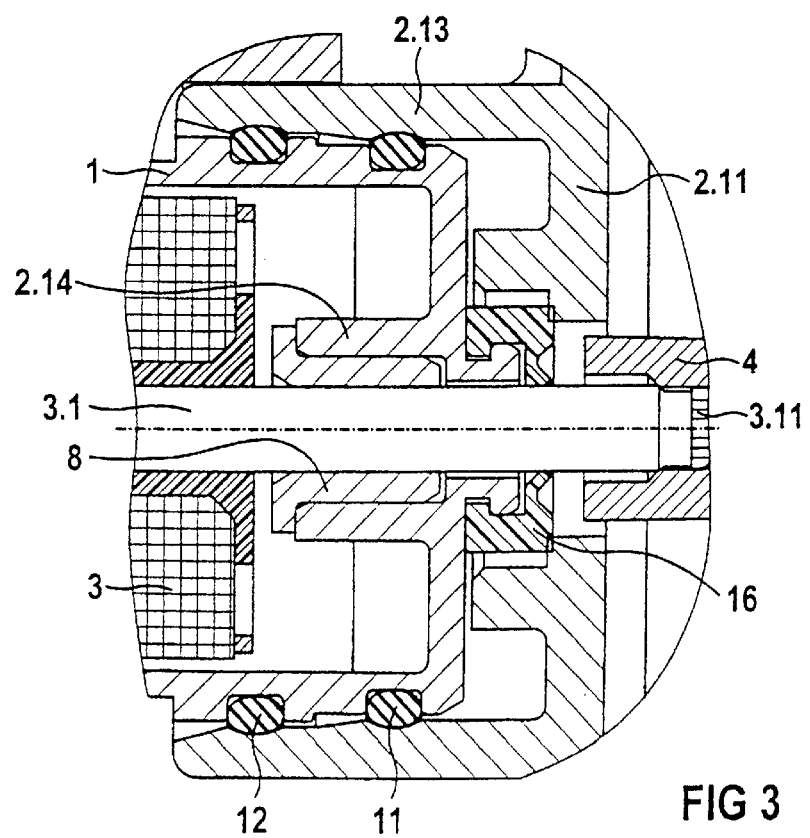
FIG. 3 is an enlarged, fragmentary, cross-sectional view of FIG. 1 in a region of the drive, base end of the pot-shaped cage.

According to another refinement of the invention, the flexible intermediate supporting parts 11, 12, 13 can each be form-lockingly fixed in a snap or latching joint on the components to be connected to increase the reliability of plug-in contact retention. The enlarged detail in FIGS. 2 and 3 show corresponding radial undercuts in the split cage 1 and in the bearing holder 10 at the pot-rim end and in the plug-in sleeve 2.13 of the flange part 2.1 and on the outer circumference of the split cage 1 at the pot-base end of the split cage. The flexible intermediate supporting parts are either latched into these undercuts in a preassembly operation or snap in when the components are assembled.

The flexible intermediate supporting parts 11, 12, 13 can be mounted or inserted as separate components, especially O-rings, or, in a particularly advantageous refinement from the assembly point of view, can be molded on as a two-component part by preassembly, e.g., onto the split cage, in particular, plastic split cage, or onto the holder of the pump casing, in particular, plastic pump casing.

Of course, the scope of protection of the invention also includes embodiments in which the flange part 2.11 is not directly part of a pump casing 2 but, for example, is used indirectly for connection to a similar component.

An advantageous assembly process for the liquid pump includes steps described in the following paragraph. A drive-end bearing, in particular, a journal bearing 8, is pressed axially into a bearing holder 2.14 at the base of the pot-shaped split cage 1 from the non-drive end. Flexible intermediate supporting parts 11, 12, in particular, O-rings, are mounted on the drive end of the split cage 1. The rotor 3 is inserted axially into the split cage 1 from the non-drive end. The drive end of the split cage 1 is pressed axially into the plug-in holder 2.13 of the pump casing 2 and, simultaneously, the drive end 3.11 of the rotor shaft 3.1 is pressed into the pump impeller 4. The pump impeller 4 can be supported from the drive end in the pump-casing top part 2.1, which has not yet been closed off by its pump-casing bottom part 2.2. The flexible intermediate supporting part 13 is mounted on the non-drive-end bearing holder 10. The non-drive-end bearing holder 10, which has been prefitted with a bearing, in particular, a journal bearing 9, is pressed axially into the split cage 1 from the non-drive end. The cap 7 together with the wound stator assembly 5 is mounted axially onto the plug-in holder 2.12 of the pump-casing top part 2.1 from the non-drive end, bringing it to bear on the flange part 2.11. The pump-casing bottom part 2.2 is connected to the pump-casing top part 2.1, preferably with a pump-casing seal 14 in between.

I claim:
1. A liquid pump, comprising:
   a permanently excited rotor;
   a split cage having an outside and an axial end and defining an interior accommodating said permanently excited rotor;
   a stator radially situated on said outside of said split cage;
   a pump impeller;
   a rotor shaft having a shaft end; and,
   a pump casing defining a casing interior accommodating said pump impeller on said shaft end;
   said pump casing connected to said axial end of said split cage;
   said pump casing and said split cage retained together through an axial plug fit; and
   said pump casing and said stator retained together through an axial plug-fit.
2. The liquid pump according to claim 1, wherein said stator is a wound stator assembly.
3. The liquid pump according to claim 1, including a cap defining a cap interior accommodating said stator, said stator and said pump casing retained together through an indirect plug-fit.

4. The liquid pump according to claim 3, wherein said split cage and one of said cap and said stator are connected by a sliding fit free of significant radial supporting loads.

5. The liquid pump according to claim 3, wherein said split cage and one of said cap and said stator are connected by a guiding and sliding fit free of significant radial supporting loads.

6. The liquid pump according to claim 1, wherein said split cage is pot-shaped and has a base, and said shaft end is a drive end projecting through said base into said pump casing and receiving said pump impeller.

7. The liquid pump according to claim 1, wherein said pump impeller has a holder and said rotor shaft is inserted axially into said holder.

8. The liquid pump according to claim 1, wherein said rotor shaft has a non-drive shaft end, said split cage has a non-drive cage end, and including a bearing holder holding said non-drive shaft end, said bearing holder being retained on said non-drive cage end in an axial plug-fit.

9. The liquid pump according to claim 6, wherein said rotor shaft has a non-drive shaft end, said split cage has a non-drive cage end, and including a bearing holder holding said non-drive shaft end, said bearing holder being retained on said non-drive cage end in an axial plug-fit.

10. The liquid pump according to claim 8, including a cap defining a cap interior accommodating said stator, and wherein:
   said split cage is configured to be assembled in an axial-plug fit with said pump casing from said non-drive shaft end;
   at least one of said stator and said cap is configured to receive said stator in an axial-plug fit with said pump casing;
   said rotor shaft is configured to be assembled in an axial-plug fit with said pump impeller supported from said shaft end; and
   said non-drive end bearing holder is configured to be assembled in an axial-plug fit with said split cage.

11. The liquid pump according to claim 9, including a cap defining a cap interior accommodating said stator, and wherein:
   said split cage is configured to be assembled in an axial-plug fit with said pump casing from said non-drive shaft end;
   at least one of said stator and said cap is configured to receive said stator in an axial-plug fit with said pump casing;
   said rotor shaft is configured to be assembled in an axial-plug fit with said pump impeller supported from said shaft end; and
   said non-drive end bearing holder is configured to be assembled in an axial-plug fit with said split cage.

12. The liquid pump according to claim 1, including a cap defining a cap interior accommodating said stator, said cap being configured to match user-specific requirements.

13. The liquid pump according to claim 1, including a cap defining a cap interior accommodating said stator, said cap being configured to match user-specific connection and installation specifications.

14. The liquid pump according to claim 1, including a cap defining a cap interior accommodating said stator, said split cage having plug-in holders, said stator having plug-in holders, said cap having plug-in holders, and said pump casing having:
   a motor side;
   a radial flange disposed at said motor side;
   an integrally formed axially projecting plug-in sleeve and plug-in holders mating corresponding ones of said plug-in holders of said split cage, said plug-in holders of said stator, and said plug-in holders of said cap.

15. The liquid pump according to claim 1, including:
   a bearing holder holding said non-drive shaft end, said bearing holder being retained on said non-drive cage end in an axial plug-fit; and
   at least one flexible intermediate supporting part in a region of a mutual plug-fit retention between said split cage and said pump casing and between said bearing holder and said split cage.

16. The liquid pump according to claim 15, wherein said at least one flexible intermediate supporting part is at least one flexible, elastomeric, intermediate supporting part.

17. The liquid pump according to claim 16, wherein said at least one flexible, elastomeric, intermediate supporting part is at least one O-ring.

18. The liquid pump according to claim 15, wherein said at least one flexible intermediate supporting part is form-lockingly fixed relative to a respective pair of said split cage, said pump casing, and said bearing holder.

19. The liquid pump according to claim 18, wherein said form lock is at least one of a mutual snap connection and a latching connection.

20. The liquid pump according to claim 15, wherein said at least one flexible intermediate supporting part is integrated with at least one of said split cage and said pump casing.

21. The liquid pump according to claim 1, wherein said pump casing has motor side and is divided axially into a pump-casing top part and a pump-casing bottom part, said pump-casing top part is disposed on said motor side; and said pump-casing bottom part faces away from said motor side and is connected to said pump-casing top part.

22. The liquid pump according to claim 21, wherein said pump-casing top part has an integral pressure branch.

23. The liquid pump according to claim 21, wherein said pump-casing bottom part has an integral intake branch.

24. The liquid pump according to claim 21, wherein said pump-casing bottom part is to be configured to match user specific requirements.

25. A detergent liquid pump for household appliances to be driven by a single-phase synchronous motor having a permanently magnetic rotor, comprising:
   a split cage having an outside and an axial end and defining an interior accommodating said permanently magnetic rotor;
   a stator radially situated on said outside of said split cage;
   a pump impeller;
   a rotor shaft having a shaft end; and
   a pump casing defining a casing interior accommodating said pump impeller on said shaft end;
   said pump casing connected to said axial end of said split cage;
   said pump casing and said split cage retained together through an axial plug fit; and
   said pump casing and said stator retained together through an axial plug-fit.

* * * * *